US010467331B2

(12) United States Patent
Bernath et al.

(10) Patent No.: US 10,467,331 B2
(45) Date of Patent: Nov. 5, 2019

(54) SYSTEMS AND METHODS FOR PROCESSING MODIFIABLE FILES GROUPED INTO THEMED DIRECTORIES FOR PRESENTATION OF WEB CONTENT

(71) Applicant: Toshiba Global Commerce Solutions Holdings Corporation, Tokyo (JP)

(72) Inventors: David Bernath, Cary, NC (US); Luis F. Lopez, Raleigh, NC (US); Xianhua Liu, Chapel Hill, NC (US); Zachary M. Darden, Cary, NC (US); Bradley T. Marchesseault, Cary, NC (US); Bobby Hargett, Jr., Raleigh, NC (US); Jarrad A. Giles, Raleigh, NC (US)

(73) Assignee: TOSHIBA GLOBAL COMMERCE SOLUTIONS HOLDINGS CORPORATION, Tokyo (JP)

(*) Notice: Subject to any disclaimer, the term of this patent is extended or adjusted under 35 U.S.C. 154(b) by 793 days.

(21) Appl. No.: 14/274,976

(22) Filed: May 12, 2014

(65) Prior Publication Data

US 2014/0344668 A1    Nov. 20, 2014

Related U.S. Application Data

(60) Provisional application No. 61/898,063, filed on Oct. 31, 2013, provisional application No. 61/824,351, filed on May 16, 2013.

(51) Int. Cl.
*G06F 17/21* (2006.01)
*G06F 17/22* (2006.01)
*G06F 16/958* (2019.01)

(52) U.S. Cl.
CPC ........ *G06F 17/2247* (2013.01); *G06F 16/986* (2019.01); *G06F 17/218* (2013.01)

(58) Field of Classification Search
CPC ...... G06Q 20/20; G06Q 20/387; G06Q 20/02; G06Q 20/0222
USPC ........................................................ 715/234
See application file for complete search history.

(56) References Cited

U.S. PATENT DOCUMENTS

| 5,581,064 | A | 12/1996 | Riley et al. |
| 5,979,757 | A | 11/1999 | Tracy et al. |
| 6,189,792 | B1 | 2/2001 | Heske |
| 6,314,428 | B1 | 11/2001 | Brew et al. |
| 7,028,262 | B2 | 4/2006 | Estrada et al. |
| 7,152,221 | B2 | 12/2006 | Andrew et al. |
| 7,694,277 | B2 | 4/2010 | Yuknewicz et al. |
| 7,836,458 | B1 | 11/2010 | Gwozdz et al. |

(Continued)

OTHER PUBLICATIONS

Alejandre, "What is a Child Theme," 2012, available at: http://www.wpthemedetector.com/what-is-a-child-theme/.*

(Continued)

*Primary Examiner* — Shawn S Joseph
(74) *Attorney, Agent, or Firm* — Olive Law Group, PLLC

(57) ABSTRACT

Systems and methods for processing modifiable files grouped into themed directories for presentation of web content are disclosed. According to an aspect, a method includes grouping a plurality of modifiable files into one or more directories for use by a World Wide Web application. Further, the method includes associating a unique theme with the one or more directories. The method also includes processing the files based on the theme for presenting web content.

19 Claims, 4 Drawing Sheets

(56) References Cited

U.S. PATENT DOCUMENTS

| | | | |
|---|---|---|---|
| 2002/0149618 A1* | 10/2002 | Estrada | G06Q 10/10 715/760 |
| 2003/0084401 A1 | 5/2003 | Abel et al. | |
| 2005/0075927 A1 | 4/2005 | Nash | |
| 2005/0173517 A1 | 8/2005 | Suk et al. | |
| 2005/0268279 A1* | 12/2005 | Paulsen | G06F 8/38 717/110 |
| 2008/0178075 A1 | 7/2008 | Trethaway et al. | |
| 2009/0094584 A1 | 4/2009 | Dheap et al. | |
| 2009/0210481 A1 | 8/2009 | Fletcher et al. | |
| 2010/0250351 A1 | 9/2010 | Gillenson et al. | |
| 2011/0047019 A1 | 2/2011 | Cervenka et al. | |
| 2011/0289499 A1 | 11/2011 | Haubold et al. | |
| 2011/0302018 A1 | 12/2011 | Norcross | |
| 2011/0314091 A1* | 12/2011 | Podjarny | G06F 17/30905 709/203 |
| 2012/0030103 A1 | 2/2012 | Hughes et al. | |
| 2012/0198481 A1 | 8/2012 | Liang et al. | |
| 2012/0216184 A1 | 8/2012 | Jones et al. | |
| 2012/0209673 A1 | 11/2012 | Spviak | |
| 2012/0331519 A1 | 12/2012 | Yu et al. | |
| 2013/0054336 A1 | 2/2013 | Graylin | |
| 2013/0275197 A1 | 10/2013 | Thibedeau et al. | |
| 2014/0156370 A1 | 6/2014 | Vaughan | |

OTHER PUBLICATIONS

Superuser, "How can I recursively copy files by file extension, preserving directory structure?" https://superuser.com/questions/299938/how-can-i-recursively-copy-files-by-file-extension-preserving-director (Year: 2011).*

International Preliminary Report on Patentability for PCT International Appliaction No. PCT/US2014/038339.

International Preliminary Report on Patentability for PCT International Application No. PCT/US2014/038354.

International Search Report for PCT International Application No. PCT/US2014/038354.

Written Opinion of the International Searching Authority for PCT International Application No. PCT/US2014/038354.

U.S. Office Action—Final Rejection for U.S. Appl. No. 14/279,690 dated Jun. 6, 2017.

Non-Final Office Action issued in counterpart U.S. Appl. No. 14/279,690 dated Apr. 25, 2018.

Hoyer et al., Business Models for Digital Business Ecosystems: The Case of the Open Negotiation Environment (ONE) Platform, 2009 3rd IEEE International Conf. on Digital Ecosystems and Technologies, 978-1-4244-2346-0-09; 2009 IEEE; pp. 181-186.

* cited by examiner

Base File

```
body {
 background:#000000;
 margin: 0px;
 overflow: hidden;
}

.splashBackground {
 background-image:url('toshiba_splash.png');
 width: 1280px;
 height: 768px;
position:absolute;
}
```

Extension File

```
.splashBackground {
 background-image:url('uShopSplash.png');
 font: bold 1.0em sans-serif;
}

.addedStuff {
 font: bold 1.0em sans-serif;
 width: 200px;
 height: 30px;
}
```

Output File

```
body {
 background:#000000;
 margin: 0px;
 overflow: hidden;
}

.splashBackground {
 background-image:url('uShopSplash.png');
 width: 1280px;
 height: 768px;
 position:absolute;
 font: bold 1.0em sans-serif;
}

.addedStuff {
 font: bold 1.0em sans-serif;
 width: 200px;
 height: 30px;
}
```

FIG. 3

Base File
{
  "control": {
      "version": "1.0"
  },
  "values": ["a1", "a2"]
}

Extension File
{
  "control": {
      "version": "1.0"
  },
  "values": ["a1", "a3"]
}

Resulting File
{
  "control": {
      "version": "1.0",
      "files": ["Base", "Extension"]
  },
  "values": ["a1", "a2", "a3"]
}

FIG. 4

Base File

Width = 1280
Height = 768
Position = left

Extension File
Width = 1900
Name = Test

Output File

Width = 1900
Height = 768
Position = left
Name = Test

FIG. 5

SYSTEMS AND METHODS FOR PROCESSING MODIFIABLE FILES GROUPED INTO THEMED DIRECTORIES FOR PRESENTATION OF WEB CONTENT

CROSS REFERENCE TO RELATED APPLICATION

This application claims the benefit of U.S. Provisional Patent Application No. 61/898,063, filed Oct. 31, 2013 and titled SYSTEMS AND METHODS FOR PROCESSING MODIFIABLE FILES GROUPED INTO THEMED DIRECTORIES FOR PRESENTATION OF WEB CONTENT, and further claims priority to U.S. Provisional Patent Application No. 61/824,351, filed May 16, 2013 and titled POINT OF COMMERCE SYSTEMS AND METHODS, the contents of which are hereby incorporated herein by reference in their entireties.

TECHNICAL FIELD

The present invention relates to Internet communications, and more specifically, to the processing of modifiable files grouped into themed directories for presentation of web content.

BACKGROUND

It is beneficial for software to be configurable and customizable. Often this is done by putting the configurable values in a separate text file outside the software code that can be modified using a text editor. These values can subsequently be read at runtime, and the application can use these values to configure itself. In a Web 2.0 environment in such applications as retail systems, for example, configuration and customization can extend beyond just key value pair files. It is desired to have the ability to replace files at runtime to obtain desired results. By including different files into an application at runtime, the behavior and how the application looks can be significantly changed. It is desired to accomplish this without adding additional network traffic or processing on a client. In addition, it is desired for the server to support different clients using different configurations at the same time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for processing modifiable files grouped into themed directories for presentation of web content. According to an aspect, a method includes grouping a plurality of modifiable files into one or more directories for use by a World Wide Web (WWW) application. Further, the method includes associating a unique theme with the one or more directories. The method also includes processing the files based on the theme for presenting web content, such as web pages.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIG. 3 depicts a diagram of example software code showing how two CSS files may be merged in accordance with embodiments of the present invention;

FIG. 4 depicts a diagram of example software code showing how two JSON files may be merged in accordance with embodiments of the present invention; and FIG. 5 depicts a diagram of example software code showing how two property files may be merged in accordance with embodiments of the present invention.

DETAILED DESCRIPTION

Figure 1:
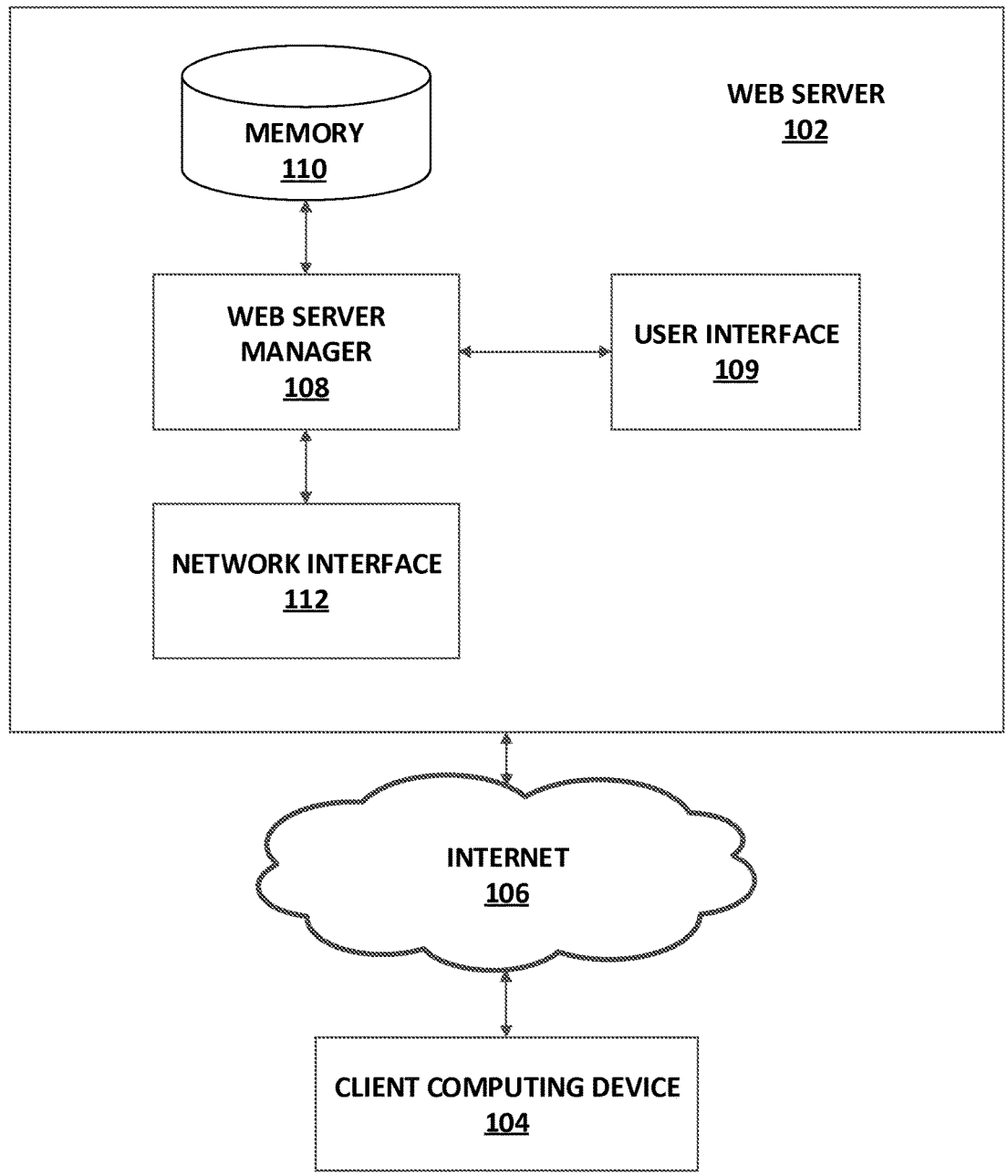
FIG. 1 is a block diagram of a system for processing modifiable files grouped into themed directories for presentation of web contents in accordance with embodiments of the present invention.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of device including one or more electronic components. For example, a computing device including hardware, software, firmware, the like, and combinations thereof. A computing device may include one or more processors and memory or other suitable non-transitory, computer readable storage medium having computer readable program code for implementing methods in accordance with embodiments of the present invention. A computing device may be, for example, retail equipment such as POS equipment. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD). A computing device can also include any type of conventional computer, for example, a laptop computer or a tablet computer. A typical mobile computing device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or microbrowsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on smart phone, the examples may similarly be implemented on any suitable computing device, such as a computer.

The presently disclosed invention is now described in more detail. For example, FIG. 1 illustrates a block diagram of a system for processing modifiable files grouped into themed directories for presentation of web contents in accordance with embodiments of the present invention. Referring to FIG. 1, the system includes a web server 102 and a client computing device 104 communicatively connected together via the Internet 106. The web server 102 is configured to operate within a WWW environment for providing web pages or interlinked hypertext documents, or other web content, to clients, such as client computing device 104, via the Internet 106. The web server 102 may be one of multiple servers operating in a server farm. The client computing device 104 may be configured with a web browser with which one can view web content, such as web pages containing text, images, video, and/or other multimedia. Further, one can use the web browser to navigate between web pages via hyperlinks or other navigation tools.

The web server 102 may be any suitable computing device having hardware, software, firmware, or combinations thereof configured to deliver web content, such as web pages, that can be accessed through the Internet 106. The web server 102 may include a web server manager 108 for implementing the functions described herein. As an example, the web server manager 108 may be implemented by one or more processors (not shown) and memory 110. Further, the web server 102 may include a network interface 112 for communicating with the Internet 106. The web server 102 may also include a user interface 109, such as a keyboard, display, mouse, and/or other devices for interfacing with a user. Further, for example, a user of the web server 102 may interface by use of another computing device.

In accordance with embodiments of the present invention, a system as disclosed can allow a user, such as an operator of the web server 102, to extend or override values in files as well as replace complete files used by Web 2.0 applications at runtime. Systems and methods as disclosed herein may implement this functionality by delivering a directory structure of modifiable and replaceable files grouped under a theme name. The root/base theme can then be extended by copying the directory structure into the new directory which then becomes a new theme that extends from the root theme. Any files that the user wants to extend or override are then copied and modified in the correct directory for the theme. These functions can be implemented by the web server manager 108.

When the web server starts, the web server manager 108 can process all the theme directories. Any files in a parent theme not in the child theme can be copied into the child theme. Any files in the child theme that are also in the parent theme can be processed based on the file type. In some cases, the files may be merged. In other cases, the parent files can be ignored. Whether the files are merged or the parent files ignored can depend on the type of file. The result is that each theme directory can contain all the base files plus any changes from any of the themes in its hierarchy. The Web 2.0 application may then use the files from the correct theme based on a URL parameter or another external factor.

Figure 2:
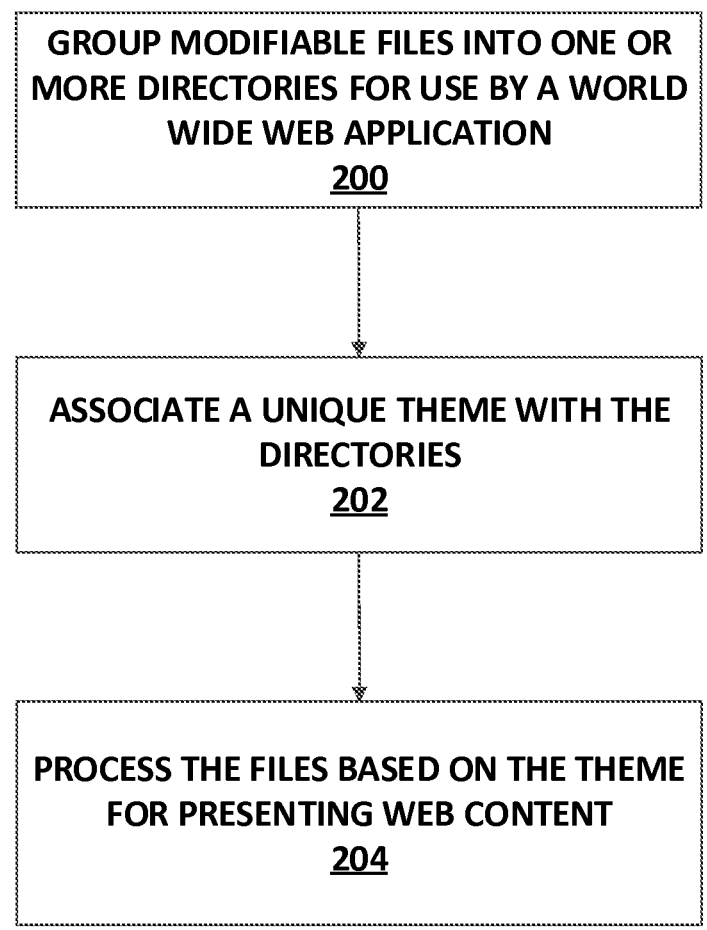
FIG. 2 is a flowchart of an example method for processing modifiable files grouped into themed directories for presentation of web contents in accordance with embodiments of the present invention.

FIG. 2 illustrates a flowchart of an example method for processing modifiable files grouped into themed directories for presentation of web contents in accordance with embodiments of the present invention. The method is described in this example as being implemented by the web server 102, although it should be understood that the method may be implemented by one or more suitable computing devices. Referring to FIG. 2, the method includes grouping 200 modifiable files into one or more directories for use by a WWW application. For example, the web server manager 108 can put all files that can be modified or replaced in a Web 2.0 application into a group of directories. These groups of files and directories may then be put into a main directory. The directories may be stored in the memory 110.

The method of FIG. 2 includes associating 202 a unique theme with the directories. Continuing the aforementioned example, the main directory and all subdirectories and files within them may make up a theme. Themes can either be a root theme (does not extend another theme) or a child theme (extends another child or root theme). Root themes contain the default values and files for the application. A child theme may only contain the files or parts of a file that are different from the files in its inheritance hierarchy. This can make it easy to change a value high in the inheritance chain and have it go down to all the themes that extend from it. This functionality can help with software upgrades as new values and files can be added to the application without having to update every theme in the inheritance chain. Also, any changes made to existing files may not overwrite changes made by extenders or end users as only the root and base files are upgraded.

Because of the different types of files that make up a Web 2.0 application, different rules are provided in accordance with the present disclosure. An example list of some of the file types and how the theme code treats them follows:

Image files—The file in the child theme is used if a file with the same name and location is found in the ancestor chain. Otherwise, the file in the ancestor chain is copied down to the theme's output directory.

HTML files—The file in the child theme is used if a file with the same name and location is found in the ancestor chain. Otherwise, the file in the ancestor chain is copied down to the theme's output directory.

JavaScript files—The file in the child theme is used if a file with the same name and location is found in the ancestor chain. Otherwise the file in the ancestor chain is copied down to the theme's output directory.

CSS files—The file in the child theme is merged if a file with the same name and location is found in the ancestor chain. This is done in such a way that the resulting file is a superset of all the values for the same files in the ancestor hierarchy. In the case where the same attribute has different values, the value of the lowest child in the hierarchy is used. Otherwise, if the file is not in the child theme, the resulting merged file in the ancestor chain is copied down to the theme's output directory.

JSON files—The file in the child theme is merged if a file with the same name and location is found in the ancestor chain. This is done in such a way that the resulting file is a superset of all the values for the same files in the ancestor hierarchy. In the case where the same attribute has different values, the value of the lowest child in the hierarchy is used. Otherwise, if the file is not in the child theme, the resulting merged file in the ancestor chain is copied down to the theme's output directory.

Property files—The file in the child theme is merged if a file with the same name and location is found in the ancestor chain. This is done in such a way that the resulting file is a superset of all the values for the same files in the ancestor hierarchy. In the case where the same attribute has different values, the value of the lowest child in the hierarchy is used. Otherwise, if the file is not in the child theme, the resulting merged file in the ancestor chain is copied down to the theme's output directory.

NLS Bundle files—The property files used for NLS are treated the same way as regular property files as described above. But in addition to the combined property files being generated, JSON files compatible with Dojo's NLS code are also generated in the output directory. This allows both the server (Java) and the client (JavaScript/Dojo) to share the same translation files. This can save translation cost and helps keep the translations consistent between the two environments.

The method of FIG. 2 includes processing 204 the files based on the theme for presenting web content. Continuing the aforementioned example, all the files are processed on the web server at startup. This can eliminate performance problems. In this way, the user does not have to wait for the theme files to be resolved when they are trying to run the application. This can also minimize the amount of processing that the web client has to perform. The fact that the files are processed on the server also means that only one copy (the correct one for the given theme) of any given file is sent to the client. Additionally, on the files that are merged, the comments and other white space characters are removed to make the files smaller. These features help minimize the load on the network.

FIG. 3 depicts a diagram of example software code showing how two CSS files may be merged in accordance with embodiments of the present invention.

FIG. 4 depicts a diagram of example software code showing how two JSON files may be merged in accordance with embodiments of the present invention.

FIG. 5 depicts a diagram of example software code showing how two property files may be merged in accordance with embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
using at least one processor and memory for:
grouping a plurality of modifiable files into one or more directories for use by a world wide web (WWW) application, each modifiable file of the plurality of modifiable files associated with a file type;
associating a unique theme with the one or more directories, wherein the unique theme comprises a root theme and a child theme, wherein the root theme does not extend from the one or more directories of the WWW application and the child theme extends from the root theme of the one or more directories of the WWW application and contains a second group of modifiable files, identified within the plurality of modifiable files, that are different then the plurality of modifiable files in the one or more directories;
copying the plurality of modifiable files into one or more new directories which creates a new unique theme that extends from the root theme;
defining a rule for processing each modifiable file of the plurality of files to modify the one or more new directories of files of the WWW application based on the new unique theme and the file type of each modifiable file of the plurality of files,
wherein the rule comprises merging each respective modifiable file in the second group of modifiable files contained in the child theme when the respective modifiable file is of a same file type contained in the plurality of modifiable files; and
processing the plurality of modifiable files based on the new unique theme and the rule to modify the one or more new directories of the WWW application for presenting web content.

2. The method of claim 1, wherein the plurality of modifiable files are each one of text file, an image file, a HyperText Markup Language (HTML) file, a JavaScript file, a cascading style sheet (CSS) file, a JavaScript Object Notation (JSON) file, a property file, and an NLS bundle file.

3. The method of claim 1, wherein the plurality of modifiable files each include configurable values.

4. The method of claim 1, wherein the plurality of modifiable files each include one or more key-value pairs.

5. The method of claim 1, wherein associating a unique theme comprises associating a parent theme with one of the modifiable files of the plurality of modifiable files and a child theme with another of the modifiable files of the plurality of modifiable files.

6. The method of claim 5, wherein processing the files comprises:
determining whether the modifiable file associated with the parent theme is not in the child file; and
in response to determining that the modifiable file associated with the parent theme is not in the child file, copying the parent theme file into the child theme.

7. The method of claim 5, wherein processing the files comprises:
determining whether the file associated with the child theme is in the parent theme; and
in response to determining that the file associated with the child theme is in the parent theme, processing the file associated with the child theme based on file type.

8. The method of claim 1, wherein processing the plurality of modifiable files comprises using the plurality of modifiable files based on the theme and a URL parameter.

9. The method of claim 1, further comprising:
receiving input for modifying one of the modifiable files of the plurality of modifiable files; and
modifying the one of the modifiable files based on the input.

10. A system comprising:
at least one processor and memory; and
a web server manager configured to:
group a plurality of modifiable files into one or more directories for use by a world wide web (WWW) application, each modifiable file of the plurality of modifiable files associated with a file type;
associate a unique theme with the one or more directories, wherein the unique theme comprises a root theme and a child theme, wherein the root theme does not extend from the one or more directories of the WWW application and the child theme extends from the root theme of the one or more directories of the WWW application and contains a second group of modifiable files, identified within the plurality of modifiable files, that are different then the plurality of modifiable files in the one or more directories;
copy the plurality of modifiable files into one or more new directories which creates a new unique theme that extends from the root theme;
define a rule for processing each modifiable file of the plurality of files to modify the one or more new directories of files of the WWW application based on the new unique theme and the file type of each modifiable file of the plurality of files,
wherein the rule comprises merging each respective modifiable file in the second group of modifiable files contained in the child theme when the respective modifiable file is of a same file type contained in the plurality of modifiable files; and
process the plurality of modifiable files based on the new unique theme and the rule to modify the one or more new directories of the WWW application for presenting web content.

11. The system of claim 10, wherein the plurality of modifiable files are each one of text file, an image file, a HyperText Markup Language (HTML) file, a JavaScript file, a cascading style sheet (CSS) file, a JavaScript Object Notation (JSON) file, a property file, and an NLS bundle file.

12. The system of claim 10, wherein the plurality of modifiable files each include configurable values.

13. The system of claim 10, wherein the plurality of modifiable files each include one or more key-value pairs.

14. The system of claim 10, wherein the web server manager is configured to associate a parent theme with one of the modifiable files of the plurality of modifiable files and a child theme with another of the modifiable files of the plurality of modifiable files.

15. The system of claim 14, wherein the web server manager is configured to:
determine whether the modifiable file associated with the parent theme is not in the child file; and
copy the parent theme file into the child theme in response to determining that the modifiable file associated with the parent theme is not in the child file.

16. The system of claim 14, wherein the web server manager is configured to:
determine whether the file associated with the child theme is in the parent theme; and
process the file associated with the child theme based on file type in response to determining that the file associated with the child theme is in the parent theme.

17. The system of claim 10, wherein the web server manager is configured to use the plurality of modifiable files based on the theme and a URL parameter.

18. The system of claim 10, the web server manager is configured to:
receive input for modifying one of the modifiable files of the plurality of modifiable files; and
modify the one of the modifiable files based on the input.

19. A computer program product comprising a non-transitory computer readable storage medium having program instructions embodied therewith, the program instructions readable by a computing device to cause the computing device to:
group, by the computing device, a plurality of modifiable files into one or more directories for use by a world wide web (WWW) application, each modifiable file of the plurality of modifiable files associated with a file type;
associate, by the computing device, a unique theme with the one or more directories, wherein the unique theme comprises a root theme and a child theme, wherein the root theme does not extend from the one or more directories of the WWW application and the child theme extends from the root theme of the one or more directories of the WWW application and contains a second group of modifiable files, identified within the plurality of modifiable files, that are different then the plurality of modifiable files in the one or more directories;
copy, by the computing device, the plurality of modifiable files into one or more new directories which creates a new unique theme that extends from the root theme;
define, by the computing device, a rule for processing each modifiable file of the plurality of files to modify the one or more new directories of files of the WWW application based on the new unique theme and the file type of each modifiable file of the plurality of files, wherein the rule comprises merging each respective modifiable file in the second group of modifiable files contained in the child theme when the respective modifiable file is of a same file type contained in the plurality of modifiable files; and
process, by the computing device, the plurality of modifiable files based on the new unique theme and the rule to modify the one or more new directories of the WWW application for presenting web content.

* * * * *